Figure 1:
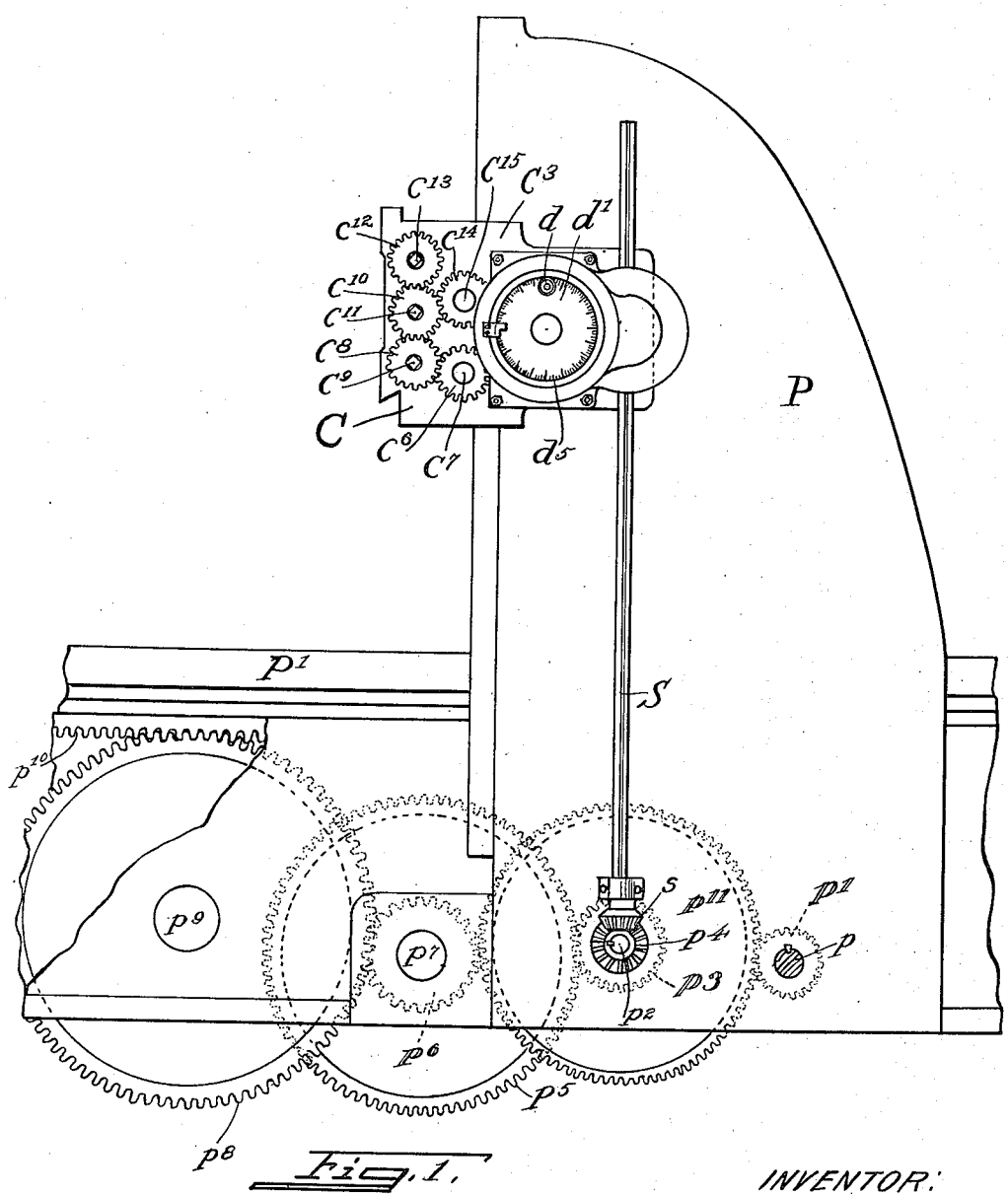

INVENTOR:
Howard W. Hunt
Forrest E. Cardullo.
BY Walter A. Knight
ATTORNEYS.

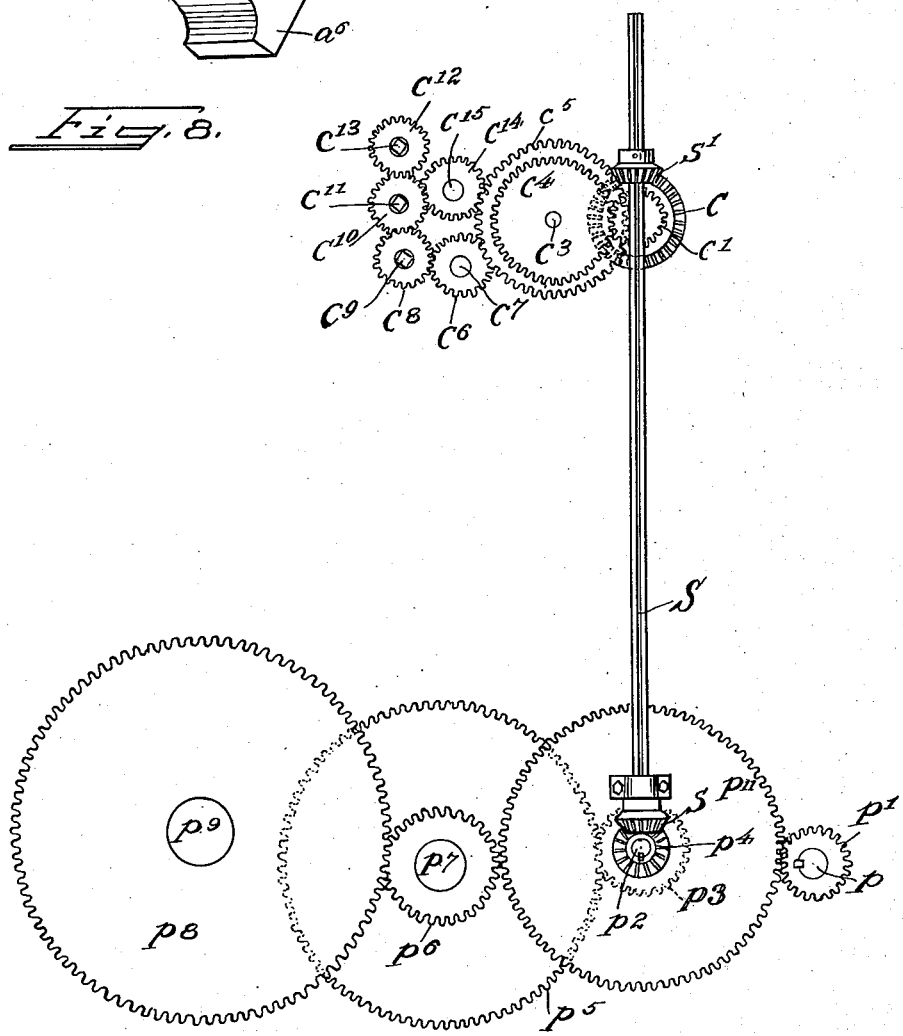

H. W. HUNT AND F. E. CARDULLO.
RATCHET MECHANISM.
APPLICATION FILED JULY 29, 1920.
1,400,068.
Patented Dec. 13, 1921.
4 SHEETS—SHEET 3.
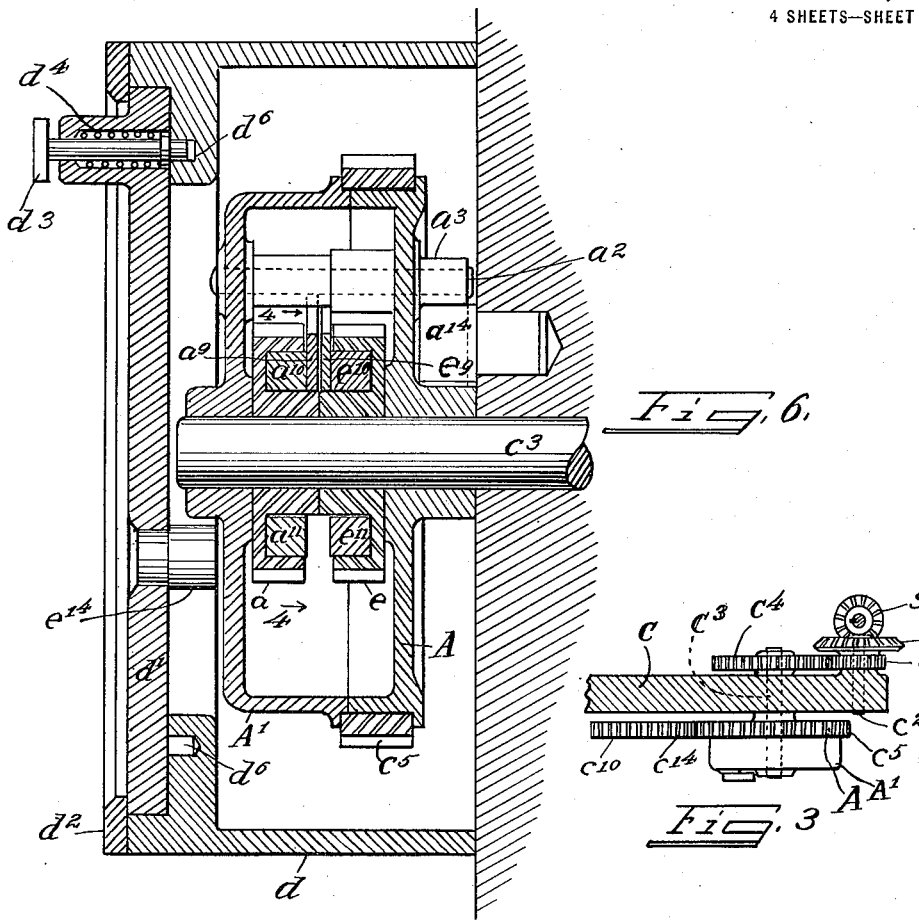
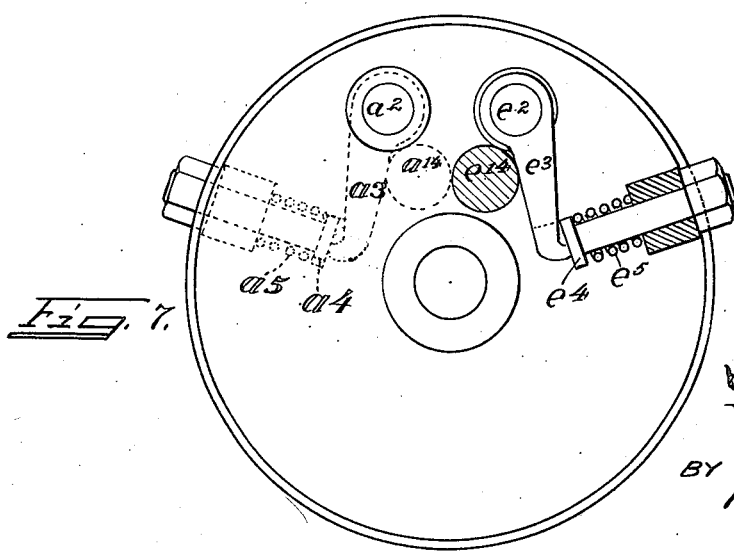
INVENTOR:
Howard W. Hunt
Forrest E. Cardullo.
BY Walter A. Knight
ATTORNEYS.

H. W. HUNT AND F. E. CARDULLO.
RATCHET MECHANISM.
APPLICATION FILED JULY 29, 1920.
1,400,068.
Patented Dec. 13, 1921.
4 SHEETS—SHEET 4.
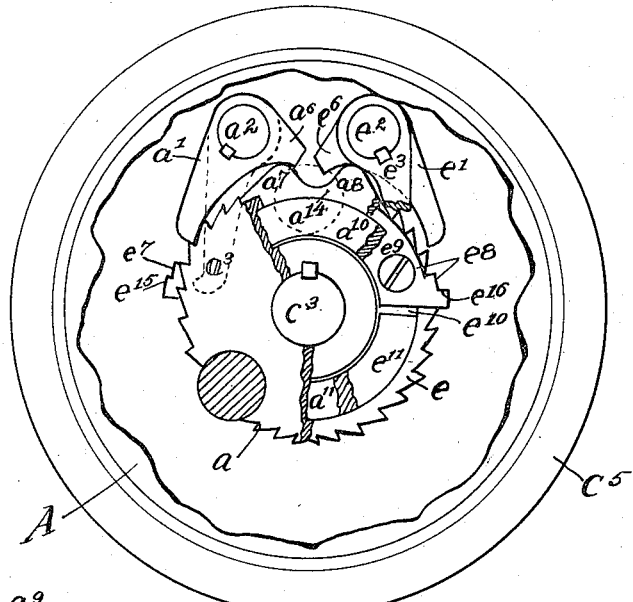
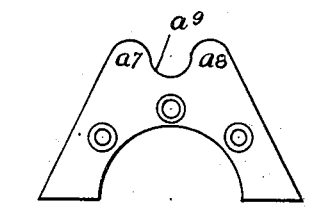
Fig. 4.
Fig. 9.
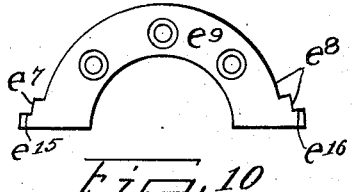
Fig. 10.
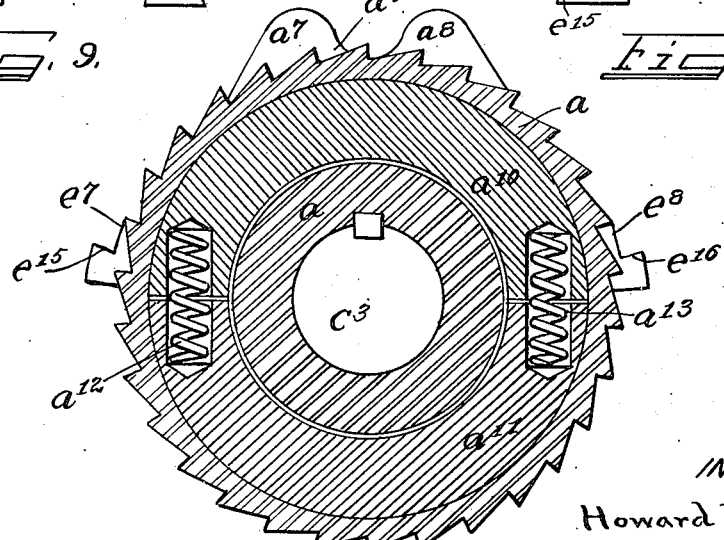
Fig. 5.
INVENTOR:
Howard W. Hunt
Forrest E. Cardullo
BY Walter A. Knight
ATTORNEYS.

UNITED STATES PATENT OFFICE.

HOWARD W. HUNT AND FORREST E. CARDULLO, OF CINCINNATI, OHIO.

RATCHET MECHANISM.

1,400,068. Specification of Letters Patent. Patented Dec. 13, 1921.

Application filed July 29, 1920. Serial No. 399,744.

*To all whom it may concern:*

Be it known that we, HOWARD W. HUNT and FORREST E. CARDULLO, both citizens of the United States, residing at Cincinnati, in the county of Hamilton and State of Ohio, have invented new and useful Improvements in Ratchet Mechanisms, of which the following is a specification.

Our improvement relates to ratchet mechanisms consisting of driving means revoluble alternately in one direction and then the other, and of the driven element driven alternately in one direction and then the other, and means for disengaging the driven element from the driving means at a fixed point in the course of its revolution when driven in one direction, and with adjustable means for disengaging the driven element from the driving means at any predetermined point in the course of its revolution when driven in the other direction. Such ratchet mechanisms are suitable for use, among other things, as feeding mechanisms for machine tools where the work or cutting tools have a reciprocating motion and the driving shaft rotates first in one direction and then in the other.

Our improvement permits placing all the parts manipulated by the operator on one side of the machine where they can be conveniently reached, the parts to be handled in setting and resetting are capable of easy and quick adjustment, and having a positive drive, the operation is certain and uniform in any setting.

The particular embodiment of our invention selected for illustration is that adapted for use on a metal planer.

Figure 1. is the operating side of a planer with parts of the bed broken away;

Fig. 2. is a diagrammatic view of the gearing employed to transmit motion from the driving shafts of the planer to the feed shaft and feed screws of the cross rail;

Fig. 3. is a horizontal section through the end of the rail, on the operating side, looking downward, showing the gearing that transmits motion from the vertical shaft to the ratchet box mechanism;

Fig. 4. is the ratchet box seen from the operating side with part of the casing broken away to show the mechanism therein;

Fig. 5. is a cross section through one of the ratchets on the line 4—4 of Fig. 6 as though the device was there shown in full;

Fig. 6. is an axial section through the ratchet box;

Fig. 7. is a view of the exterior of the ratchet box from the operator's position;

Fig. 8. is a perspective of one of the ratchet pawls;

Fig. 9, a detail, is the actuating plate, and

Fig. 10, a detail, is the guard plate.

Referring now to the drawings, P is the planer housing, $p$ the drive shaft driven by belt or motor in the usual manner; rotating alternately in a clockwise and counter-clockwise direction, and $p^1$ is a pinion fixed to the shaft $p$. This pinion drives gear $p^{11}$ which is keyed to the shaft $p^2$, to which are also fixed pinion $p^3$ and bevel gear $p^4$. Pinion $p^3$ drives gear $p^5$ which is rotatively attached to pinion $p^6$, and both $p^5$ and $p^6$ are free to rotate on shaft $p^7$. Pinion $p^6$ drives gear $p^8$ mounted on stud $p^9$. Gear $p^8$ meshes with the rack $p^{10}$ on the under side of the reciprocating table $P^1$, and drives the table forward and backward alternately according to the direction of rotation of the drive shaft $p$.

A vertical shaft S journaled to the housing P is rotated by its bevel gear $s$ meshing with the bevel gear $p^4$ and is splined for the upper part of its length, where there is a slidably keyed bevel gear $s^1$, so that this gear will be raised and lowered with the cross-rail C.

Gear $s^1$ drives the bevel-gear $c$. Pinion $c^1$ fixed to gear $c$ is free to rotate with it on stud $c^2$, which is secured to the cross-rail C. Journaled in the cross-rail C is a shaft $c^3$, to the inner end of which is fixed a gear $c^4$ driven by the pinion $c^1$, while next the cross-rail on outer side is a gear $c^5$ fixed to the element A of the ratchet box casing, hereafter to be described. The outer end of the shaft $c^3$ extends through the ratchet box, formed in two parts, A, $A^1$, secured together as will hereinafter be more fully described. Stud $c^2$ and gears $c^1$ and $c^4$ might be dispensed with, and the shaft $c^3$ keyed directly to gear $c$, but we prefer to use suitable speed reduction mechanism as shown in the drawings.

Gear $c^5$ meshes with idler gear $c^6$ on stud $c^7$ and gear $c^6$ meshes with click-box gear $c^8$, which serves to rotate the feed screw $c^9$. Gear $c^8$ meshes with click-box gear $c^{10}$ which serves to rotate the down feed shaft $c^{11}$. Gear $c^{10}$ meshes with click-box gear $c^{12}$ which serves to rotate the feed screw $c^{13}$. All these click-boxes are of the usual construction, that is, are provided with ratchet mechanism adapted to rotate their shafts in either direction as desired. Another idler gear $c^{14}$ on stud $c^{15}$ also meshes with gear $c^5$ and meshing with click-box gear $c^{10}$ will drive gears $c^8$ and $c^{12}$ in the reverse direction. It will be understood that studs $c^7$ and $c^{15}$ are long enough so that idler gears $c^6$ and $c^{14}$ may be slid into and out of mesh, and that only one will be in mesh at a time. The exact train of gears used to accomplish the above described purpose is not important. Feed screws $c^9$ and $c^{13}$ serve to move the tool carrying members of the planer mounted on the rail horizontally, and $c^{11}$, vertically, in the manner now customary in the art; and these, together with the click-boxes, tool carrying members and rail being of types now well known, need no further description.

Within the ratchet box A, A¹, and fast to the shaft $c^3$ are ratchet wheels $a$, $e$. The teeth of the ratchet $a$ are so turned as to engage and drive the pawl $a^1$ in a clockwise direction, and the teeth of the ratchet $e$ are turned in the reverse direction so as to engage and drive the pawl $e^1$ in a counter-clockwise direction. (See Fig. 4.) The pawl $a^1$ is fixed to the short shaft $a^2$ which is journaled in the ratchet box and projects through the rear portion A. Pawl $e^1$ is fixed to the short shaft $e^2$, which is journaled in the ratchet box and projects through the front portion A¹.

Fixed to the rearwardly projecting end of the shaft $a^2$, is a lever $a^3$; and to the frontwardly projecting end of the shaft $e^2$, is fixed a lever $e^3$. These levers $a^3$ and $e^3$ are bent at their free ends to better engage resiliently mounted bumper plates $a^4$, $e^4$ respectively. When in extended position, the springs $a^5$, $e^5$, are under considerable compression, and the pawls $a^1$, $e^1$, are just free of the tops of their respective ratchets.

To cause either of the pawls $a^1$, $e^1$ to engage the teeth of the ratchet wheels $a$, $e$, respectively, at the proper time, they are provided with projections $a^6$, $e^6$, adapted to be engaged by the humps $a^7$, $a^8$, respectively, on the edge of an actuating plate $a^9$, which is secured to section $a^{10}$ of a two-part friction ring, the other part of which is $a^{11}$. This two-part friction ring is seated in a recess in the ratchet $a$ and is expanded by means of the springs $a^{12}$, $a^{13}$ seated in holes in the ends of the parts $a^{10}$, $a^{11}$.

In a recess in the ratchet $e$ is seated a two-part friction ring, with sections $e^{10}$, $e^{11}$ and springs (not shown) in all respects similar to the section $a^{10}$, $a^{11}$, and springs $a^{12}$, $a^{13}$, respectively heretofore described.

When the shaft $c^3$ is rotated in a clockwise direction, the friction ring $a^{10}$, $a^{11}$, the first named section carrying the actuating plate $a^9$ also revolves with the ratchet wheel $a$ in a clockwise direction, carrying the hump $a^7$ into contact with the projection $a^6$ of the pawl $a^1$ forcing the pawl into engagement with a tooth of the ratchet wheel $a$ (see Figs. 4 and 5). This causes the shaft $a^2$, pawl $a^1$, ratchet box A, A¹, gear $c^5$, and all the mechanism secured to the ratchet box to rotate in a clockwise direction until the lever $a^3$ strikes the pin $a^{14}$ fixed to the end of the rail C. This lifts the pawl $a^1$ out of engagement with the ratchet $a$ and forces the free bent end of the lever $a^3$ against the bumper plate $a^4$ compressing the spring $a^5$ and bringing the ratchet box to rest without shock.

To prevent the pawl $a^1$ from again engaging the ratchet $a$ until the direction of rotation of the shaft $c^3$ has been reversed, a guard plate $e^9$ is provided secured to section $e^{10}$ of the two-part friction ring. As soon as the pawl $a^1$ is lifted free of the teeth of the ratchet $a$ and the ratchet box brought to rest, as before described, raised step $e^7$ slides under the end of the pawl $a^1$ and face $e^{15}$ engages the pawl $a^1$ and arrests rotation of the guard plate $e^9$ and friction ring $e^{10}$, $e^{11}$.

When the shaft $c^3$ reverses its direction of rotation, counter clockwise rotation causes the face $e^{15}$ to recede from the pawl $a^1$, and the step $e^7$ to slide from under the pawl, leaving the pawl $a^1$ free to engage the ratchet $a$ whenever the shaft $c^3$ again revolves in a clockwise direction. Meantime, continued counter clockwise rotation brings the hump $a^8$ on the actuating plate $a^9$ against the projection $e^6$ of the pawl $e^1$ forcing this pawl into engagement with a tooth of the ratchet wheel $e$. This causes the shaft $e^2$, pawl $e^1$, ratchet box A, A¹, gear $c^5$ and all the mechanism secured to the ratchet box to rotate in a counter clockwise direction until the lever $e^3$ strikes the pins $e^{14}$ fixed to a rotatable disk $d^1$ secured by a ring $d^2$ to a recess in the gear guard $d$, which is bolted to the end of the rail C.

This lifts the pawl $e^1$ out of engagement with the ratchet $e$ and forces the free bent end of the lever $e^3$ against the bumper plate $e^4$ compressing the spring $e^5$ and bringing the ratchet box to rest without shock. As soon as the pawl $e^1$ is lifted free of the teeth of the ratchet $e$ and the ratchet box brought to rest, step $e^8$ slides under the end of the pawl $e^1$ and face $e^{16}$, engages the pawl $e^1$ and arrests rotation of the guard plate $e^9$ and friction ring $e^{10}$, $e^{11}$.

The axis of rotation of the disk $d^1$ coincides with the axis of the shaft $c^3$ so that the pin $e^{14}$ can be set to any desired angular position in relation to the pin $a^{14}$. Graduations $d^5$ marked with the amount of feed expressed as a decimal or other fraction of an inch or in any other desired units, are provided on the face of the disk $d$, and the disk is secured in its set position, spring pin $d^3$, normally held seated in one of the holes $d^6$ in the gear guard $d$ by the spring $d^4$. A series of these holes $d^6$ register with the series of graduations $d^5$.

It will be understood that shaft $c^3$ and the ratchet wheels fixed thereto, rotate first in one direction and then in the other with the reciprocation of the planer table, the amount of rotation being determined by the length of stroke of the table. This causes the ratchet box to rotate through a definite arc, the amount of which is determined by the relative angular positions of the fixed pin $a^{14}$ and of the adjustable pin $e^{14}$.

Gear $c^5$ is thereby enabled to turn click box gears $c^8$, $c^{10}$ and $c^{12}$ first in one direction and then in the other at each reciprocation of the table. The click box gears which are of the usual ratchet type turn the feed screws $c^9$, $c^{13}$ or the feed shaft $c^{11}$ each time that the click box gears are rotated in operative direction; causing the planer heads and the tools they carry to be moved the desired amount with each reciprocation of the table.

The ratchet mechanism hereinbefore described revolves in clockwise direction during the cutting stroke and in a counter-clockwise direction during the return stroke. It is not convenient to adjust the position of the movable pin $e^{14}$ when the lever $e$ is pressing against it. In order that the operator shall not be obliged to remember or to determine whether lever $e^3$ is in contact with pin $e^{14}$, the mechanism is so arranged that this contact occurs during the return stroke only and the operator has only to remember that the adjustment is to be changed during the cutting stroke. While the mechanism can be made so as to be adjustable during the return stroke, we prefer to make it as described herein so as to be adjustable during the cutting stroke for more time is available then.

As is common in all such machines, the adjustment of the double acting pawls in the click boxes, causes the feed screws and shaft to revolve in either direction as desired, and the tools to feed either from or toward the operating position, in accordance with the position of said pawls.

It is sometimes desirable to feed the tools at the beginning of the cutting stroke and sometimes at the beginning of the return stroke and it is also desirable sometimes to feed away from the operating position and sometimes toward the operating position irrespective of the time at which the feed is made. It is, therefore, necessary that the direction of motion of the click box gears sometimes be clockwise at the beginning of the cutting stroke and counter-clockwise at the beginning of the return stroke and that sometimes these motions be in the opposite direction at these times. In order to effect this without changing the relation between the direction of the rotation of the ratchet mechanism and the direction of motion of the table, it is necessary to interpose means for reversing the direction of motion of the click box gears relative to that of the ratchet mechanism. This is done by providing the two studs $c^7$ and $c^{15}$ and gears $c^6$, $c^{14}$, respectively, slidable thereon, either of which may be slid into engagement after the other has been withdrawn from engagement, in order to effect the reversal of the relative direction of rotation.

It is only necessary to turn the plate $d^1$ until the graduations $d^5$ show the required amount of feed after which the operation of the machine will cause the tools to move by the required amount with each reciprocation of the tool or the work.

It will be obvious to one skilled in the art that the mechanism herein shown and described may be varied in many details without department from the spirit of the invention; hence we do not limit ourselves to the precise structure shown.

We claim as our invention and desire to secure by Letters Patent of the United States:

1. In combination, ratchet mechanism consisting of driving means revoluble alternately in one direction and then in the other and of a driven element driven alternately in one direction and then in the other, means for disengaging the driven element from said driving means at a fixed point in the course of its motion when driven in one direction, and adjustable means for disengaging said driven element from said driving means at any predetermined point in the course of its motion when driven in the other direction.

2. In combination with the feeding mechanism of a machine, one of whose working elements has a limited movement in one direction and then in the other, a ratchet mechanism rotatable in opposite directions alternately, means for disengaging said ratchet mechanism at a fixed point in the course of its motion when rotating in one direction, and adjustable means for disengaging said ratchet mechanism at any predetermined point in the course of its motion when rotating in the other direction.

3. In feed mechanism for reciprocating machine tools, the combination of toothed means, revoluble alternately in one direction and then in the other, pawls drivable by said toothed means, a projection on each of said pawls, a fixed stop against which one of these projections impinges in the course of its motion to disengage its pawl, and an adjustable stop against which the other projection impinges in the course of its motion to disengage its pawl.

4. In feed mechanism for reciprocating machine tools, the combination of a pair of ratchet wheels, a pawl for and drivable by each of said ratchet wheels, a projection on each of said pawls, a fixed stop against which one of these projections impinges in the course of its motion to disengage its pawl, and an adjustable stop against which the other projection impinges in the course of its motion to disengage its pawl.

5. In feed mechanism for reciprocating machine tools, the combination of a pair of oppositely acting ratchet wheels revoluble alternately in one direction and then in the other, a pawl for and drivable by each of said ratchet wheels, a lever for and adapted to actuate each of said pawls, a fixed stop against which one of said levers impinges in the course of its motion for the purpose of disengaging its pawl from its ratchet wheel, and a movable stop against which the other lever impinges in the course of its motion for the purpose of disengaging the other pawl from its ratchet wheel at any predetermined point.

6. In feed mechanism for reciprocating machine tools, the combination of a pair of oppositely acting ratchet wheels, a pawl for and drivable by each of said wheels, separate means for lifting each of said pawls out of engagement with its ratchet wheel, a fixed stop against which one of said lifting means impinges in the course of its motion for said purpose, a movable stop against which the other means impinges in the course of its motion at any predetermined point for said purpose, and means for forcing each of said pawls into engagement with its respective ratchet.

7. In feed mechanism for reciprocating machine tools, the combination of a pair of oppositely acting ratchet wheels each revoluble alternately in one direction and then the other, a pawl for and drivable by each of the said ratchet wheels, a lever for and adapted to actuate each of said pawls to lift it out of engagement with its ratchet wheel, a fixed stop against which one of said levers impinges in the course of its motion for the purpose of disengaging its pawl from its ratchet wheel, a movable stop against which the other lever impinges in the course of its motion for the purpose of disengaging the other pawl from its ratchet wheel at any predetermined point, a projection upon each of said pawls and frictionally operated means adapted to engage either of the said projections for the purpose of forcing either pawl into engagement with its ratchet wheel at proper times.

8. In feed mechanism for reciprocating machine tools, the combination of a pair of oppositely acting ratchet wheels, a pawl for and drivable by each of said wheels, separate means for lifting each of said pawls out of engagement with its ratchet wheel, a fixed stop against which one of said lifting means impinges in the course of its motion for the purpose of lifting said pawl out of engagement with its ratchet wheel, a movable stop against which the other means impinges in the course of its motion at any predetermined point for the purpose of lifting its pawl out of engagement with its ratchet wheel, means for forcing each of said pawls into engagement with its respective ratchet, and a frictionally operated guard adapted to hold either of said pawls out of engagement with its ratchet wheel after said pawl has been disengaged and until the ratchet wheel driving said pawl reverses its direction of rotation.

9. In feed mechanism for reciprocating machine tools, the combination of a pair of oppositely acting ratchet wheels each revoluble alternately in one direction and then the other, a pawl for and drivable by each of the said ratchet wheels, a lever for and adapted to actuate each of said pawls to lift it out of engagement with its ratchet wheel, a fixed stop against which one of said levers impinges in the course of its motion for the purpose of disengaging its pawl from its ratchet wheel, a movable stop against which the other lever impinges in the course of its motion for the purpose of disengaging the other pawl from its ratchet wheel at any predetermined point, a projection upon each of said pawls, frictionally operated means adapted to engage either of the said projections for the purpose of forcing either pawl into engagement with its respective ratchet wheel at proper times, and a frictionally operated guard adapted to hold either of said pawls out of engagement with its ratchet wheel after it has been disengaged therefrom and until said ratchet wheel reverses its direction of rotation.

10. In combination, ratchet mechanism consisting of driving means revoluble alternately in one direction and then in the other and of a driven element driven alternately in one direction and then in the other, means for disengaging the driven element from said driving means at a fixed point in the course of its motion when driven in one direction, adjustable means for disengaging said driven element from said driving means at any predetermined point in the course of its motion when driven in the other direction, and a scale in conjunction with the adjustable means for visually indicating the amount of motion to be permitted on a given setting by the ratchet mechanism.

11. In combination, in a machine tool, ratchet mechanism consisting of a driving part or parts revoluble alternately in one direction and then in the other and of a driven part or parts driven alternately in one direction and then in the other, means for disengaging the driven part or parts at a fixed point in the course of its or their motion when driven in one direction, adjustable means for disengaging the said driven part or parts at any desired point in the course of its or their motion when driven in the other direction, and means for transmitting the limited motion of the driven part or parts.

12. In a metal planer, a ratchet mechanism revolving alternately in one direction and the other, means for disengaging said mechanism at a fixed point in the course of its motion when revolving in one direction, adjustable means for disengaging the said ratchet mechanism at any desired point in the course of its motion when revolving in the other direction, means for transmitting the limited motion of the ratchet mechanism, and means for reversing the direction of motion of the said transmitting means with reference to that of the said ratchet mechanism, interposed between the ratchet mechanism and the said transmitting means.

In testimony whereof we have hereunto set our hands in presence of two subscribing witnesses.

HOWARD W. HUNT.
FORREST E. CARDULLO.

Witnesses:
WILBUR M. HUNT,
NORMA D. BERGER.